US012784526B2

(12) United States Patent
Rutherford

(10) Patent No.: US 12,784,526 B2
(45) Date of Patent: Nov. 3, 2026

(54) COMPACT REJECT BIN

(71) Applicant: NCR Corporation, Atlanta, GA (US)

(72) Inventor: Craig Rutherford, Blairgowrie (GB)

( * ) Notice: Subject to any disclaimer, the term of this patent is extended or adjusted under 35 U.S.C. 154(b) by 238 days.

(21) Appl. No.: 17/838,371

(22) Filed: Jun. 13, 2022

(65) Prior Publication Data

US 2023/0401920 A1 Dec. 14, 2023

(51) Int. Cl.
*B65H 29/58* (2006.01)
*B65H 5/06* (2006.01)
*G07D 11/13* (2019.01)
*G07D 11/18* (2019.01)

(52) U.S. Cl.
CPC ............. *G07D 11/18* (2019.01); *B65H 5/068* (2013.01); *B65H 29/58* (2013.01); *G07D 11/13* (2019.01); *B65H 2701/1912* (2013.01)

(58) Field of Classification Search
CPC ........ G07D 11/18; G07D 11/13; B65H 5/068; B65H 29/58; B65H 2701/1912
See application file for complete search history.

(56) References Cited

U.S. PATENT DOCUMENTS

| | | | | |
|---|---|---|---|---|
| 378,768 A * | 2/1888 | Chase | B65H 49/205 242/588.1 |
| 3,888,267 A * | 6/1975 | Gautschi | G07D 11/12 271/3.21 |
| 6,439,569 B1 * | 8/2002 | Lyga | B65H 29/51 271/226 |
| 8,066,273 B2 | 11/2011 | Connell et al. | |
| 8,757,356 B2 | 6/2014 | Peterek et al. | |
| 9,926,164 B2 * | 3/2018 | Jeschke | B65H 31/3054 |
| 2001/0022258 A1 * | 9/2001 | Satou | B65H 29/006 194/206 |
| 2006/0103065 A1 * | 5/2006 | Kotani | B65H 29/51 271/3.14 |

(Continued)

FOREIGN PATENT DOCUMENTS

| | | | |
|---|---|---|---|
| CN | 103093539 A | 5/2013 | |
| EP | 1331185 A2 * | 7/2003 | B65H 29/54 |

(Continued)

OTHER PUBLICATIONS

Machine translation of EP1331185. (Year: 2003).*

(Continued)

*Primary Examiner* — Thomas A Morrison
(74) *Attorney, Agent, or Firm* — Notaro, Michalos & Zaccaria P.C.; John S. Economou

(57) ABSTRACT

A bin for storing rejected media items at a self-service terminal such as an automated teller machine has an input channel for receiving a sequential series of media items such as checks or bank notes. Opposing driven rollers receive the sequential series of media items via the input channel and push out each of the sequential series of media items into an output channel. A storage receptacle receives each of the sequential series of media items pushed out by the opposing driven rollers via the output channel. The storage receptacle has an annular-shaped storage cavity formed by an inner cylindrical wall and an outer wall. The outer wall is at least partially cylindrical and optionally includes a plurality of ramp-like protrusions on an inner surface thereof which aid in preventing input jams at the storage receptacle.

17 Claims, 6 Drawing Sheets

(56) References Cited

U.S. PATENT DOCUMENTS

| | | | | |
|---|---|---|---|---|
| 2012/0103754 | A1 | 5/2012 | Robinson et al. | |
| 2014/0331612 | A1 | 11/2014 | Jeschke et al. | |
| 2018/0350181 | A1 | 12/2018 | Li et al. | |
| 2021/0201616 | A1 * | 7/2021 | Nakai | B65H 3/063 |

FOREIGN PATENT DOCUMENTS

| | | | | | |
|---|---|---|---|---|---|
| EP | 1331185 | B1 | | 7/2003 | |
| EP | 2211313 | A2 | | 5/2011 | |
| GB | 2358509 | A | * | 7/2001 | B65H 29/008 |
| JP | 62-21671 | | | 1/1987 | |
| JP | H08-133519 | | | 5/1996 | |
| JP | 2009-128432 | | | 6/2009 | |
| KR | 200453425 | | * | 5/2011 | |
| KR | 101185360 | B1 | | 9/2012 | |

OTHER PUBLICATIONS

Extended European Search report for corresponding European Patent Appl No. 22202410.1 dated May 23, 2023.

First Office Action in Japanese Patent Appl. No. 2022-211152 dated Sep. 5, 2023 (see translation).

Second Office Action in Japanese Patent Appl. No. 2022-211152 dated May 8, 2024 (see translation).

First Office Action in corresponding Chinese Patent Appl. No. 202211557356.6 mailed on Jul. 19, 2025 (see translation).

Office Action in corresponding European Patent Appl. No. 22202410.1 mailed on Oct. 31, 2025.

* cited by examiner

COMPACT REJECT BIN

FIELD

This disclosure relates generally to a reject bin for a self-service terminal, and more particularly relates to an improved short-edge reject bin for a self-service terminal such as an automated teller machine.

BACKGROUND

Self-service terminals (SSTs), such as automated teller machines (ATMs), typically accept a variety of media items including bank notes and checks for payment or deposit. In some cases, the SST may determine that an inserted media item (typically a check) should be rejected and returned to the user. However, in some cases a user may neglect to retrieve a returned media item, in which case, the rejected media item may be retracted from the return slot and forwarded to a specialized reject bin for holding rejected media items. In other cases, a rejected media item is not returned to the user and sent directly to the reject bin. Existing reject bins suffer from various drawbacks, technical solutions to which are disclosed herein.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
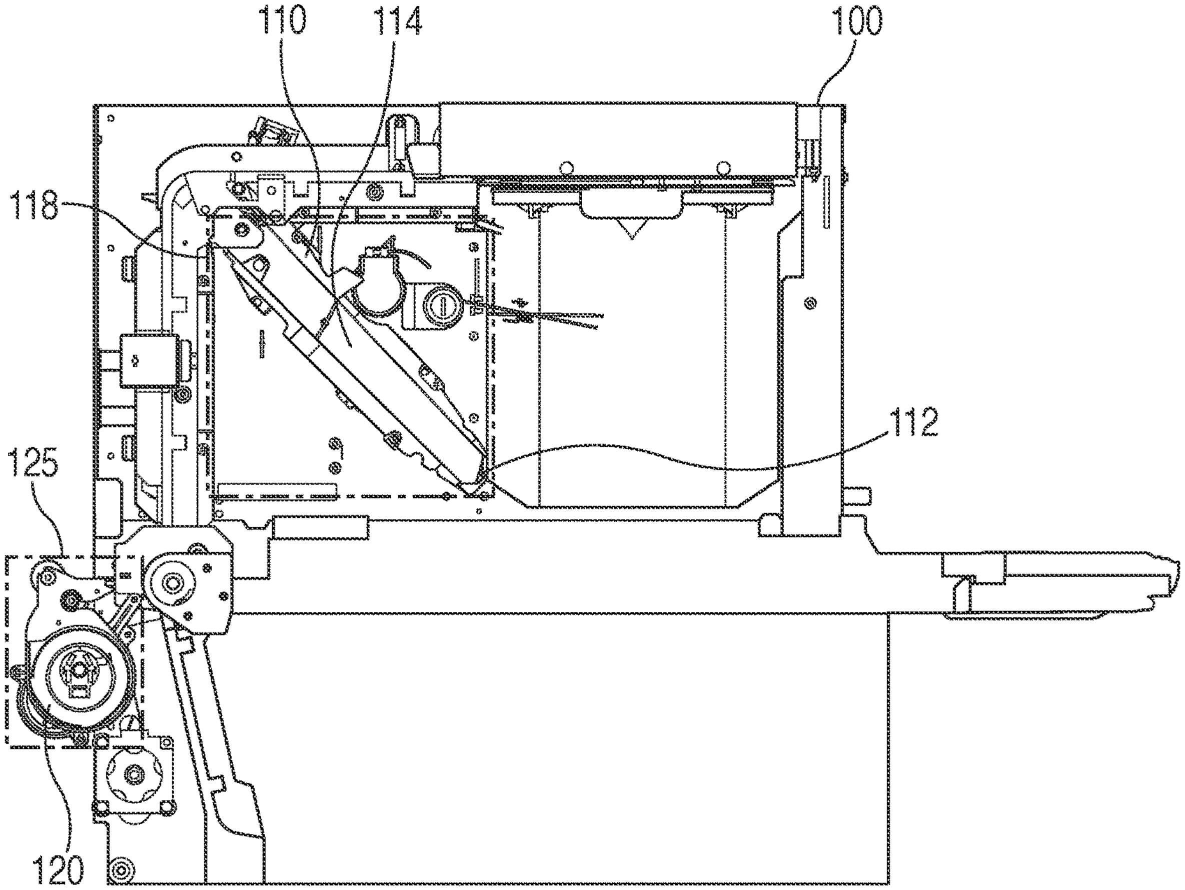
FIG. 1 is a side view of a scalable check processing module for an automated teller machine which includes a conventional reject bin and a reject bin according to the present disclosure.

The present disclosure relates to a short edge reject bin which accepts unsorted media items (e.g., checks or bank notes) within a compact space volume and with a minimum number of moving parts. A common configuration for a reject bin for an ATM is a bin with a cuboid-shaped internal compartment orientated at a forty-five degree angle from horizontal, in order to ensure that the rejected media item (e.g., a check) slides down into the compartment and to reduce the necessary height of the device. The longer dimension of the cuboid-shaped internal compartment must accommodate the longest expected media item of 225 mm (8.86 inches). This configuration is shown in FIG. 1, where a conventional reject bin 110 is shown in a scalable check processing module (SCPM) 100 for an ATM. One drawback with the conventional reject bin 110 is that the orientation of forty-five degrees requires a significant amount of space (shown by the box 118 in FIG. 1) within SCPM 100. The area required by box 118 in FIG. 1 was measured to be 18,550 mm2. A second drawback of the conventional reject bin 110 is that the cuboid-shaped internal cavity 114 has a fixed lower internal end 112 upon which one short side of an incoming media item rests against. This means that, as the reject bin 110 fills with rejected media items, a leading short edge of an incoming newly rejected media item may collide with the trailing edge of a previously inserted rejected media item, possibly causing a media jam, which in turn, could render the ATM out of service while the media jam is cleared. This is particularly problematic when the rejected media items are not in good condition, e.g., have creases or folds. In this latter case, the media items may deform by, e.g., folding or curling, which further increases the possibility of a media jam.

Referring now to FIG. 1, a scalable check processing module (SCPM) 100 for an ATM is shown which includes, for comparison purposes, both a conventional reject bin 110 as discussed above and a reject bin 120 according to the present disclosure. The reject bin 120 is smaller in overall dimensions when compared to the conventional reject bin 110. Reject bin 120 also has an outer shape which is easier to fit with a layout of a media handling device such as SCPM 100, thereby saving valuable internal space for future enhancements. The area of reject bin 120 is shown by box 125 which was measured to be 10,000 $mm^2$. Because the depth of each reject bin 110, 120 is about the same, it is clear that the internal volume required for reject bin 120 is significantly less than the conventional reject bin 110.

Figure 2:
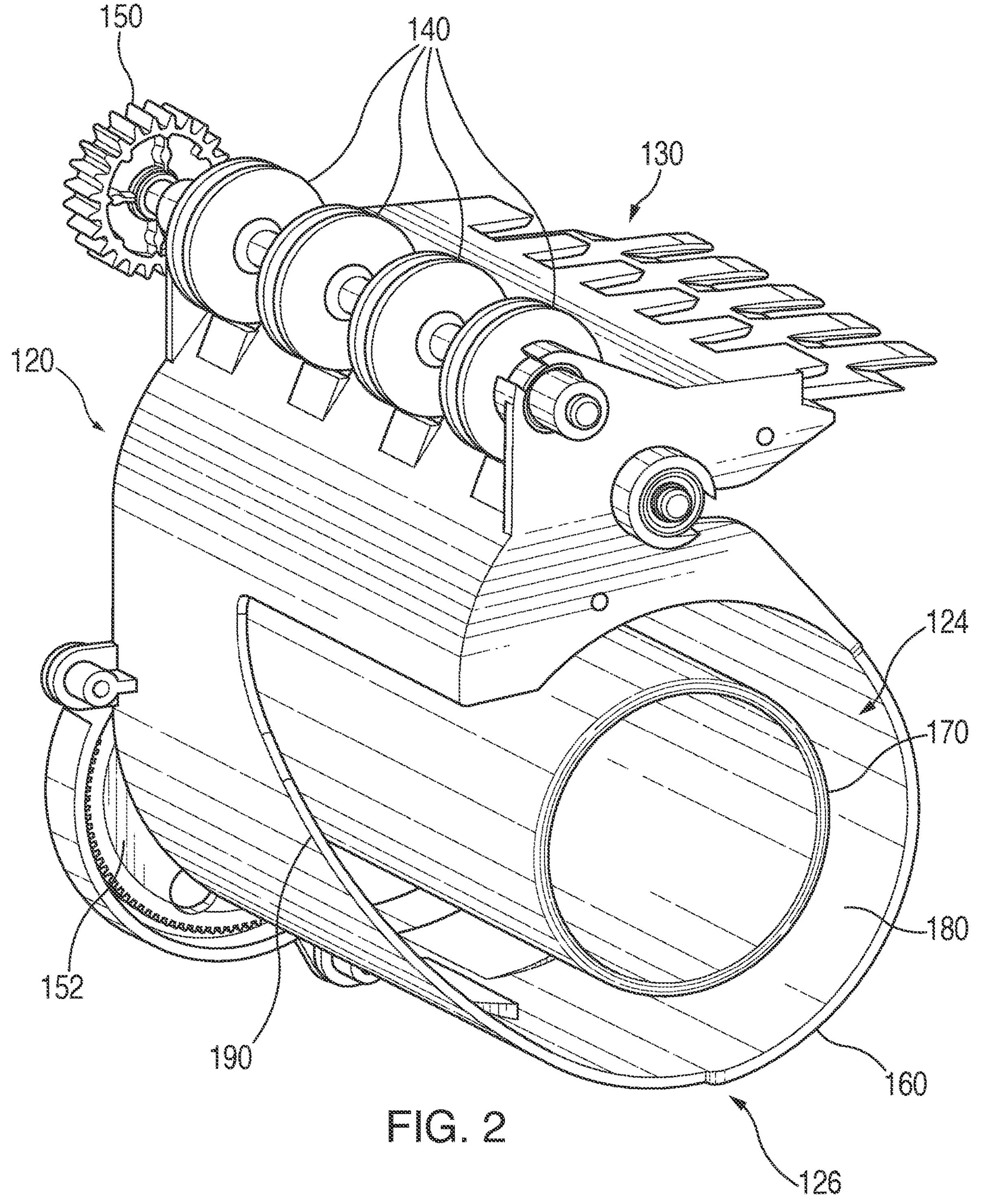
FIG. 2 is a right side perspective view of a reject bin according to the present disclosure.
Figure 3:
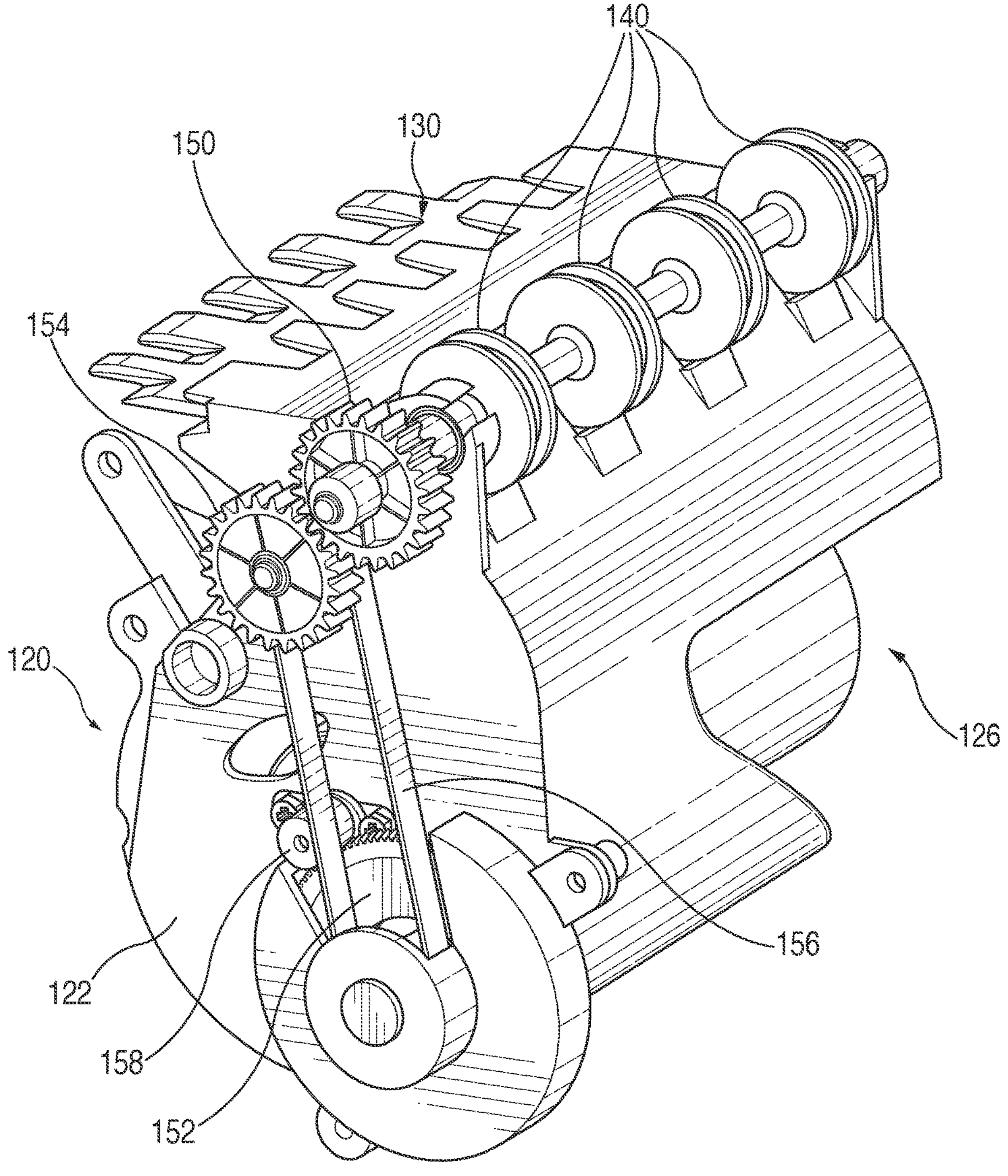
FIG. 3 is a left side perspective view of the reject bin according to the present disclosure.
Figure 4:
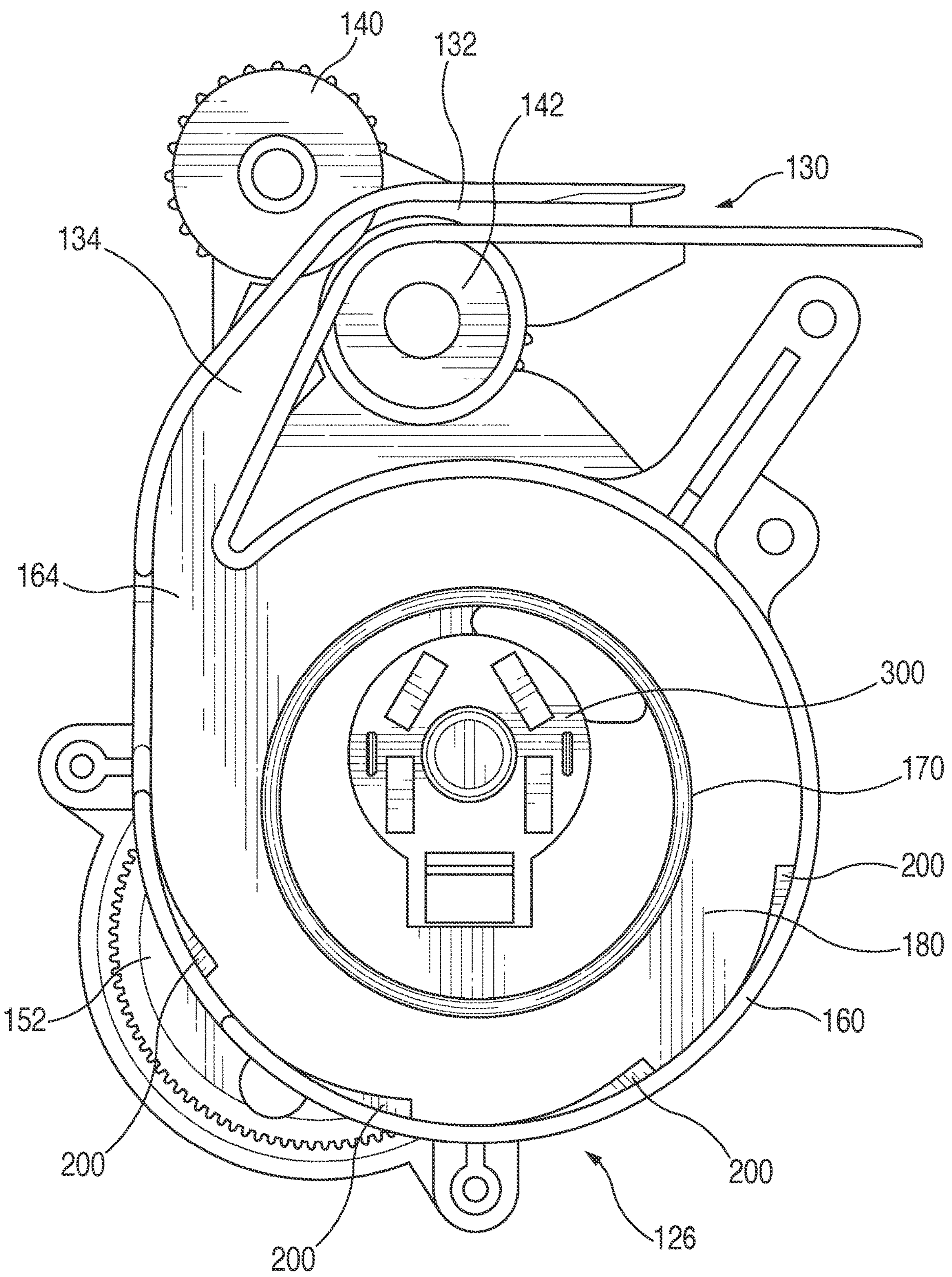
FIG. 4 is a right side view of the reject bin according to the present disclosure.

As shown in the perspective views of FIGS. 2 and 3 and the side view of FIG. 4, the reject bin 120 of the present disclosure has an input slot 130 for feeding a received sequential series of media items to rollers 140, 142 via an input channel 132. A motor 300 is shown having an output shaft 158 that drives a gear 152. Gear 152 is coupled to a belt 156 which drives a gear 154 and rollers 142 which are coupled to each other and to gear 154 via a common central shaft. A gear 150 mates with gear 154 to drive rollers 140 which are coupled to each other and to gear 154 via a common central shaft. The motor 300, gear 152, and belt 154 are optional because most media handling devices include motors or other drive elements which can be coupled, directly or indirectly, to drive gear 154 (or gear 150). The rollers 140, 142 are sized and positioned to provide a high driving force to the media items being fed into the reject bin 120, effectively stuffing each rejected media item into a storage receptacle 126 of the reject bin 120 via an output channel 134. The storage receptacle 126 has an annular storage cavity 180 that is formed by an outer partially-cylindrical wall 160 and an inner cylindrical wall 170. Motor 300 is shown positioned within the inner cylindrical wall 170. The annular storage cavity 180 has an open side 124 for accessing media items therein and is also bounded by a closed side 122. The outer wall 160 is partially-cylindrical because there is a slot 164 therein for access to output channel 134 so that each received media item is guided by the output channel into the annular storage cavity 180. The outer wall 160 optionally includes a cut-out section 190 to make it easier to access and remove the media items within the annular storage cavity 180. The inside surface of the outer wall 160 preferably includes a series (plurality) of ramp-like protrusions 200 which, as discussed below with respect to FIGS. and 6, aid in preventing media item jams within the annular storage cavity 180.

Figure 5:
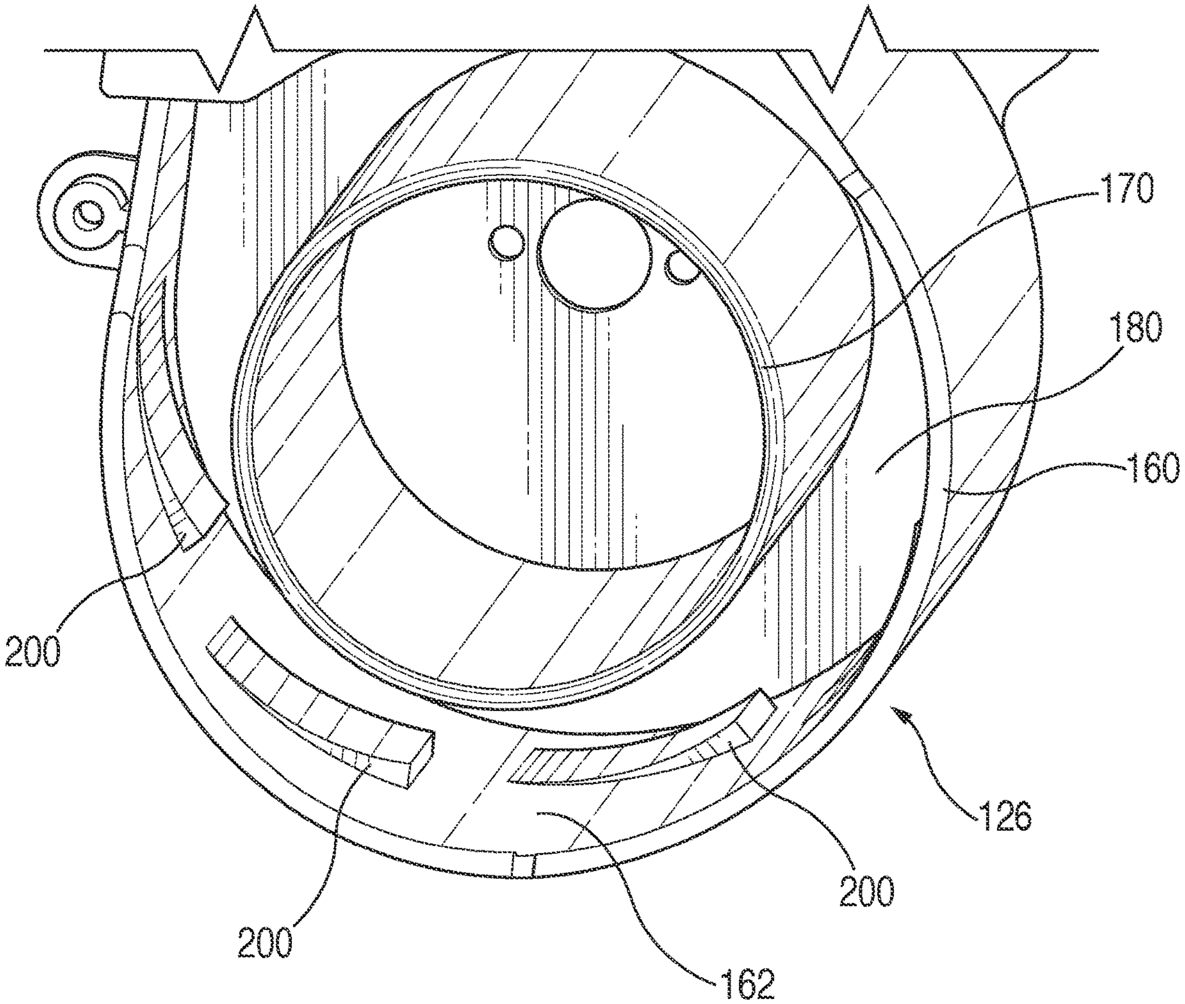
FIG. 5 is a side perspective cutaway view of an internal portion of the reject bin according to the present disclosure.
Figure 6:
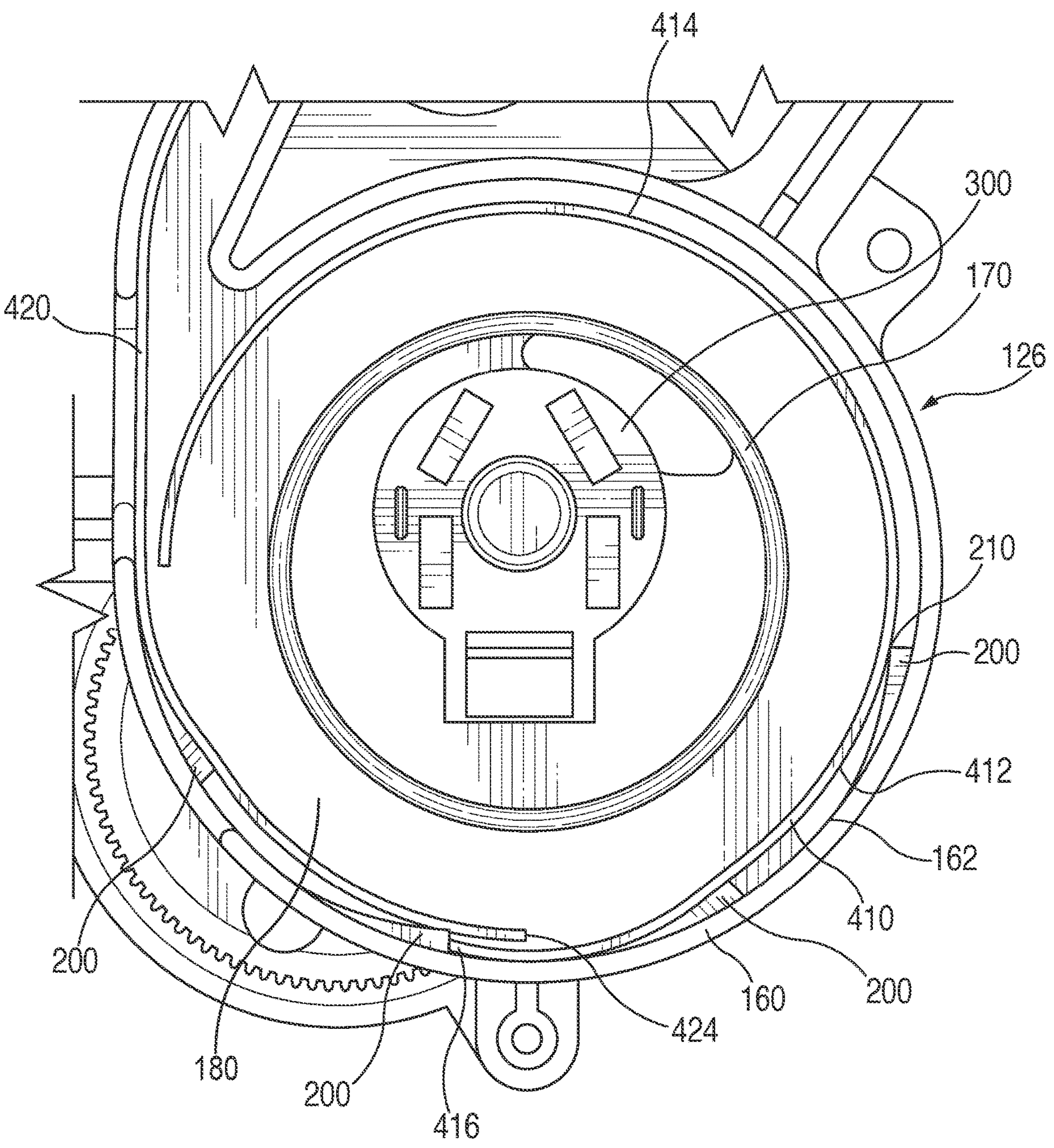
FIG. 6 is a side view of the internal portion of the reject bin showing media items inserted therein according to the present disclosure.

The annular shape of the storage cavity 180 in reject bin 120 allows media items to rotate freely within the storage cavity 180 whenever a new media item is pushed by rollers 140, 142 into the storage cavity 180, significantly reducing the potential for a fatal input jam (i.e., one that requires a service call or which otherwise puts the terminal associated with the reject bin 120 out of service). The ramp-like protrusions 200 shown in detail in FIG. 5 reduce any friction created between the inner surface 162 of the outer wall 160 and the outer surface area of the media items. FIG. 5 shows four ramp-like protrusions 200 positioned sequentially along a lower portion of the inner surface 162 of outer wall 160. The number of such elements may be reduced and still provide adequate protection from media jams. The reduction of friction facilitated by the ramp-like protrusions 200 is shown in FIG. 6, where a first media item 410 is within the storage cavity 180 and a second media item 420 is being inserted into storage cavity 180. The friction between media item 410 and the inner surface 162 of outer wall 160 is reduced because the outer surface 412 of media item 410 (i.e., the surface of media item 410 facing the inner surface 162 of outer wall 160) is raised up away from the inner surface 162 by the ramp-like protrusion 200 and in some places only contacts the tip 210 of ramp-like protrusion 200. In addition, the annular shape of storage cavity 180 means that gravity will keep an upper portion 414 away from the inner surface 162 of the outer wall, further reducing friction between the media item 410 and the inner surface 162 of the outer wall. As more and more media items are inserted into storage cavity 180, the ramp-like protrusions 200 will promote the movement of all of the media items within storage cavity 180 to rotate and thereby significantly reduce the likelihood of an input jam. Furthermore, the ramp-like protrusions ensure that a trailing end of an inserted media item (e.g., end 416 of media item 410) will drop down close to the inner surface 162 of outer wall 160 and thereby clear the way for a leading end 424 of an incoming media item 420 to provide an additional level of protection from input jams.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A bin for storing media items, comprising:
- an input channel for receiving a sequential series of media items;
- opposing driven rollers for receiving the sequential series of media items via the input channel and for pushing out each of the sequential series of media items; and
- a storage receptacle for receiving each of the sequential series of media items pushed out by the opposing driven rollers, the storage receptacle having an annular-shaped storage cavity formed by a single fixed inner cylindrical wall and a single fixed outer wall, the fixed outer wall forming a cylinder with a slot therein for receiving each of the sequential series of media items into the annular-shaped storage cavity, the annular-shaped storage cavity being configured such that media items received therein are free to rotate within the annular-shaped storage cavity as additional media items are received.

2. The bin of claim 1, further comprising an output channel, wherein the opposing driven rollers push out each of the sequential series of media items into the output channel, and wherein the storage receptacle receives each of the sequential series of media items pushed out by the opposing driven rollers via the output channel.

3. The bin of claim 1, wherein the fixed outer wall of the storage receptacle comprises a ramp-like inward-facing protrusion on an inner surface thereof.

4. The bin of claim 3, wherein the ramp-like inward-facing protrusion is positioned on a lower portion of the inner surface of the fixed outer wall.

5. The bin of claim 1, wherein the fixed outer wall of the storage receptacle comprises a plurality of ramp-like inward-facing protrusions on an inner surface thereof.

6. The bin of claim 5, wherein each of the plurality of ramp-like inward-facing protrusions is positioned on a lower portion of the inner surface of the fixed outer wall.

7. The bin of claim 1, wherein the fixed outer wall includes a cut-out region configured so that media items positioned within the annular-shaped storage cavity can be accessed.

8. The bin of claim 1, further comprising a first central shaft and a second central shaft, wherein the opposing driven rollers include upper rollers coupled to each other via the first central shaft and lower rollers coupled to each other via the second central shaft.

9. The bin of claim 8, further comprising a first gear connected to the first central shaft and a second gear connected to the second central shaft, the first gear coupled to the second gear such that the upper rollers roll in a first direction and the lower rollers roll in a second direction that is opposite the first direction when one of the first gear or the second gear is driven.

10. The bin of claim 9, further comprising a motor coupled to one of the first gear or the second gear to drive the upper rollers and the lower rollers.

11. The bin of claim 10, wherein the motor comprises a driven shaft that is coupled to one of the first gear or the second gear via a gear and belt assembly.

12. The bin of claim 11, wherein the motor is positioned within a cylindrical area formed by the inner wall of the storage receptacle.

13. A method for storing media items, comprising:
- receiving a sequential series of media items via an input channel;
- pushing out each of the sequential series of media items via opposing driven rollers; and
- receiving each of the sequential series of media items pushed out by the opposing driven rollers at a storage receptacle, the storage receptacle having an annular-shaped storage cavity formed by a single fixed inner cylindrical wall and a single fixed outer wall, the fixed outer wall forming a cylinder with a slot therein for receiving each of the sequential series of media items into the annular-shaped storage cavity, wherein media items received within the annular-shaped storage cavity are free to rotate within the annular-shaped storage cavity as additional media items are received.

14. The method of claim 13, wherein the fixed outer wall of the storage receptacle comprises a ramp-like inward-facing protrusion on an inner surface thereof.

15. The method of claim 14, wherein the ramp-like inward-facing protrusion is positioned on a lower portion of the inner surface of the fixed outer wall.

16. The method of claim 13, wherein the fixed outer wall of the storage receptacle comprises a plurality of ramp-like inward-facing protrusions on an inner surface thereof.

17. The method of claim 16, wherein each of the plurality of ramp-like inward-facing protrusions is positioned on a lower portion of the inner surface of the fixed outer wall.

* * * * *